(12) United States Patent
Zhang et al.

(10) Patent No.: US 9,724,880 B2
(45) Date of Patent: Aug. 8, 2017

(54) RESIDUE REMOVING DEVICE AND 3D PRINTER

(71) Applicant: Inventec Appliances Corp., New Taipei (TW)

(72) Inventors: Ting-Wei Zhang, Shanghai (CN); Hong-Chao Liu, Shanghai (CN)

(73) Assignee: Inventec Appliances Corp., New Taipei (TW)

( * ) Notice: Subject to any disclaimer, the term of this patent is extended or adjusted under 35 U.S.C. 154(b) by 495 days.

(21) Appl. No.: 14/256,343

(22) Filed: Apr. 18, 2014

(65) Prior Publication Data

US 2015/0056321 A1    Feb. 26, 2015

(30) Foreign Application Priority Data

Aug. 22, 2013   (CN) .................. 2013 2 0517522 U

(51) Int. Cl.
  *B29C 67/00*   (2017.01)
(52) U.S. Cl.
  CPC ................ *B29C 67/0096* (2013.01)

(58) Field of Classification Search
  CPC ................................................ B29C 67/0096
  See application file for complete search history.

(56) References Cited

U.S. PATENT DOCUMENTS

| | | | |
|---|---|---|---|
| 2011/0168347 A1* | 7/2011 | Knerr | B22D 17/2236 164/131 |
| 2016/0021982 A1* | 1/2016 | Davis | A43D 11/00 29/559 |
| 2016/0064839 A1* | 3/2016 | Goodman | H01R 12/91 439/65 |

* cited by examiner

*Primary Examiner* — Robert J Grun
(74) *Attorney, Agent, or Firm* — CKC & Partners Co., Ltd

(57) ABSTRACT

The present invention provides a residue removing device for removing residues in a partition plate, and a related 3D printer for use on a working platform. The partition plate e.g. of a 3D printer has a plurality of openings arranged in an array, and residues may be filled in the openings. The residue removing device includes a base plate and a plurality of jutting pins disposed on an upper side of the base plate. The jutting pins are arranged in an array corresponding to the openings array such that the jutting pins are capable of being inserted into the openings, in order to easily remove the residues in the openings of the partition plate.

5 Claims, 5 Drawing Sheets

RESIDUE REMOVING DEVICE AND 3D PRINTER

FIELD OF THE INVENTION

The present invention relates to a residue removing device, more particularly a residue removing device capable of easily removing residues in openings of a partition plate, and to a related 3D printer for use on a working platform.

BACKGROUND OF THE INVENTION

Three-dimensional (3D) printing is a burgeoning technology in the manufacturing industry and is referred to as a "manufacturing technique that signifies industrial revolution". The main process flow of 3D printing is briefly stated as follows. To begin with, a 3D design is produced using computer software. Then, a specific forming apparatus (commonly known as a 3D printer) is used to "print" the product, one layer after another, out of a liquid, powdery, or fibrous material. 3D printing has developed rapidly in recent years and can be applied in combination with numerical control machining, casting, cold-spray metal coating, silicone molding, etc. as an effective approach to the manufacture of modern models, molds, and parts. 3D printing not only has found applications in the aviation/aerospace industry, the automobile/motorcycle industry, the home appliance industry, biomedicine, and the cultural and creative industry, but also has taken a unique position in engineering, teaching, and researches.

The underlying principle of 3D printing is "to produce by successively added layers". The technique is also called an "additive process". Based on the shape of the final product, a 3D printer produces a plurality of successive layers, each of a small thickness and a specific shape, and the layers are sequentially bonded together to form the final 3D product.

FIG. 1 is a schematic drawing of an existing 3D printer. As shown in the drawing, a partition plate 20 with openings 210 arranged in an array is placed on a working platform 10. A solid material is extruded from the printing head 30 of the 3D printer onto the partition plate 20. As the extruded solid material grows by layers, the successively bonded layers form a product 40 on the partition plate 20.

During the manufacturing process of the product 40, however, the extruded solid material may flow into and solidify in the openings 210 of the partition plate 20. As a result, residues 220 of the solid material are left in the openings 210 once the product 40 is taken from the partition plate 20, as shown in FIG. 2, and the solidified residues 220 are very difficult to remove from the openings 210. Chances are the use of the partition plate 20 will be adversely affected. Therefore, it is highly desirable to provide a residue removing device that can readily clear away the residues 220.

BRIEF SUMMARY OF THE INVENTION

An objective of the present invention is to provide a residue removing device and a 3D printer which can remove with ease the residues in the openings of a partition plate in the 3D printer.

Therefore, the invention provides a residue removing device for removing the residues in a partition plate. The partition plate has a plurality of openings arranged in an array, and the residues may be filled in the openings. The residue removing device includes a base plate and a plurality of jutting pins. The jutting pins are disposed on an upper side of the base plate and are arranged in an array corresponding to the array of the openings such that the jutting pins are capable of being inserted into the openings. At least the tips of the jutting pins can be inserted into the openings.

In an embodiment, the residue removing device further includes a deformation element disposed on the upper side of the base plate and adjacent to the jutting pins. The deformation element in a first state is higher than at least one of the jutting pins, and in a second state is lower than the jutting pin. Furthermore, the deformation element includes a spring or an elastic rod located at an edge of the upper side of the base plate In an embodiment, the height of each of the jutting pins is larger than a thickness of the partition plate.

In an embodiment, at least one of the jutting pins is cylindrical, conical, prismatic, or resembles a bevel in shape.

In an embodiment, the partition plate is laminated and includes at least two detachable layers.

Another aspect of the present invention provides a 3D printer for use on a working platform. The 3D printer includes a partition plate having a plurality of openings arranged in an array; and a residue removing device to be disposed on the working platform and for removing residues that may be filled in the openings. The residue removing device includes a base plate, and a plurality of jutting pins disposed on an upper side of the base plate, wherein the jutting pins are arranged in an array corresponding to the openings array such that the jutting pins are capable of being inserted into the openings. In an embodiment, the residue removing device further includes a deformation element disposed on the upper side of the base plate and adjacent to the jutting pins, and the deformation element in a first state is higher than at least one of the jutting pins and in a second state is lower than the jutting pin.

The residue removing device and the 3D printer of the present invention may have the following advantages over the prior art:

1. In the residue removing device, the array of the jutting pins corresponds to that of the openings, and at least the tips of the jutting pins can be inserted into the openings. With the arrayed jutting pins respectively inserted into the arrayed openings, residues in the openings can be pushed out, thereby conveniently removing the residues in the partition plate of the 3D printer.

2. In the residue removing device, the deformation element is disposed on the upper side of the base plate, is adjacent to the jutting pins, is higher than the jutting pins when in the first state, and is lower than the jutting pins when in the second state. Thus, the residue removing device can be placed on the working platform of the 3D printer, and the partition plate, on the residue removing device. When the deformation element is in the first state, the height of the deformation element is greater than that of the jutting pins, allowing a product to be manufactured on the partition plate. Once the manufacture of the product is completed, the deformation element enters the second state, in which the height of the deformation element is less than the height of the jutting pins such that the arrayed jutting pins are respectively inserted into the arrayed openings to directly remove the residues on the 3D printer. The foregoing operation can be done with ease.

3. In the 3D printer, the partition plate is laminated and includes at least two detachable layers. When the partition plate is filled with residues, the detachable layers can be detached from each other to facilitate removal of the residues.

BRIEF DESCRIPTION OF THE SEVERAL VIEWS OF THE DRAWINGS

The structure as well as a preferred mode of use, further objectives, and advantages of the present invention will be best understood by referring to the following detailed description of some illustrative embodiments in conjunction with the accompanying drawings, in which.

DETAILED DESCRIPTION OF THE INVENTION

Figure 1:
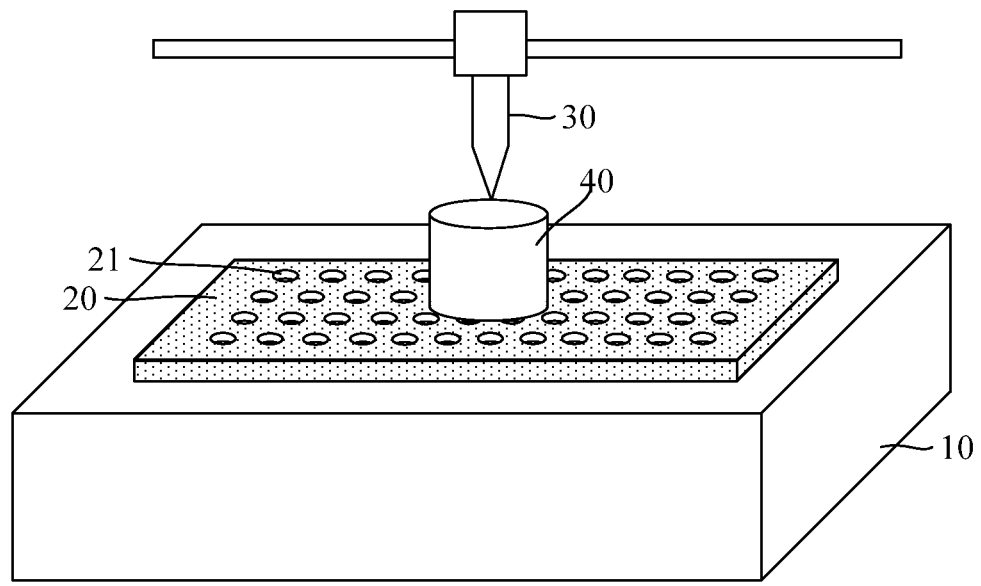
FIG. 1 schematically shows a 3D printer in the prior art.
Figure 2:
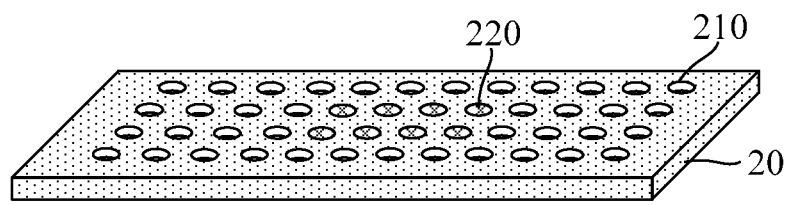
FIG. 2 schematically shows the residues in the partition plate of a 3D printer in the prior art.

The residue removing device and the 3D printer of the present invention are now detailed with reference to the accompanying drawings, in which the preferred embodiments of the present invention are shown. It is understood that a person skilled in the art may modify the invention described herein and nevertheless achieve the advantageous effects of the present invention. Therefore, the following description should be understood as to enlighten a person skilled in the art rather than as limitations imposed on the present invention.

For the sake of clarity, not all features of the embodiments are described in detail. In the description that follows, all generally known functions and structures will not be dealt with, for unnecessary details of these functions and structures may be confusing to one who tries to comprehend the present invention. In the development of any embodiment, it is believed to be necessary to produce a large amount of implementation details in order to realize the developer's specific goals, such as to modify one embodiment into another according to system or commercial constraints. It is also believed that the development could be complicated and time-consuming but is only the routine work of a person of skilled in the art.

In the following paragraphs, the present invention is more specifically described by way of example with reference to the accompanying drawings. The advantages and features of the present invention will become more obvious from the description below and the claims. It should be noted that the accompanying drawings are in very simplified forms and are not drawn to scale. The drawings are intended only to assist in explaining the objectives of the embodiments of the present invention in a convenient and clear fashion.

The core concept of the present invention is to provide a residue removing device for removing the residues in the partition plate of a 3D printer. The partition plate has a plurality of openings arranged in an array, and the residues are filled in the openings. The residue removing device is characterized by including a base plate and a plurality of jutting pins arranged in an array. The jutting pins are disposed on the upper side of the base plate, and the array of the jutting pins corresponds to the array of the openings. At least the tips of the jutting pins can be inserted into the openings. The arrayed jutting pins can be respectively inserted into the arrayed openings to push out the residues in the openings, thus conveniently removing the residues in the partition plate of the 3D printer.

The present invention also provides a 3D printer incorporating the aforesaid core concept. The 3D printer includes a working platform, a residue removing device, and a partition plate. The residue removing device is provided on the working platform, and the partition plate is provided on the residue removing device. The partition plate has a plurality of openings arranged in an array. The residue removing device includes a base plate, a plurality of jutting pins arranged in an array, and a deformation element. The jutting pins are disposed on the upper side of the base plate, and the array of the jutting pins corresponds to the array of the openings. At least the tips of the jutting pins can be inserted into the openings. The deformation element is disposed on the upper side of the base plate and is adjacent to the jutting pins. The deformation element has a first state and a second state. The deformation element is higher than the jutting pins when in the first state and is lower than the jutting pins when in the second state.

A few embodiments of the foregoing residue removing device and 3D printer are provided below to demonstrate the content of the present invention. It should be pointed out that the present invention is not limited to the embodiments disclosed herein. All improvements made by a person skilled in the art through the conventional technical means should fall within the scope and spirit of the present invention.

Figure 3:
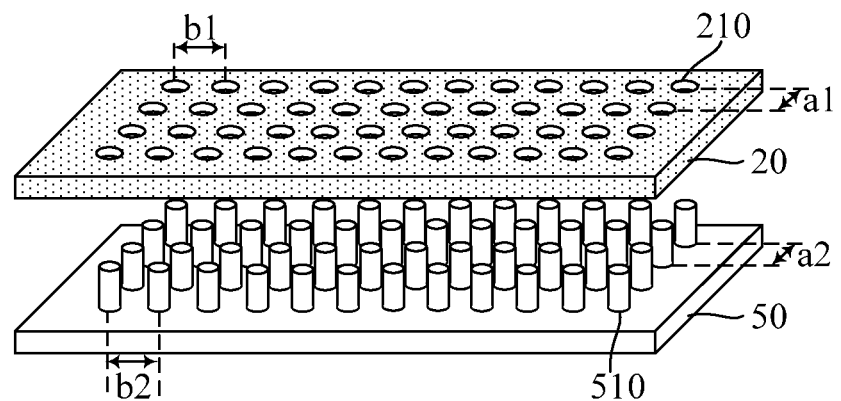
FIG. 3 is a perspective view of the residue removing device in the first embodiment of the present invention.
Figure 4:
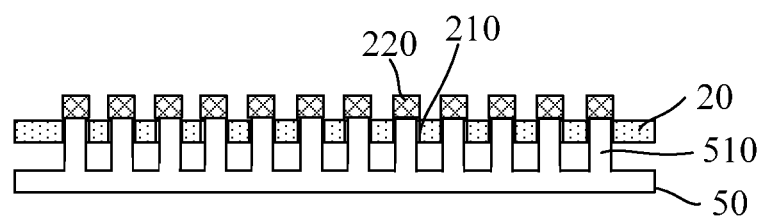
FIG. 4 is a sectional view showing how residues are removed by the residue removing device in the first embodiment of the present invention.

Please refer to FIG. 3 and FIG. 4 for the residue removing device in a first embodiment of the present invention, in which FIG. 3 is a perspective view of the residue removing device and FIG. 4 is a sectional view showing how residues are removed by the residue removing device.

In the first embodiment of the present invention, referring to FIG. 3, the residue removing device includes as base plate 50 and a plurality of jutting pins 510 arranged in an array. The residue removing device is configured for removing the residues in the partition plate 20 of a 3D printer, wherein the partition plate 20 has a plurality of openings arranged in an array. In this embodiment, the openings 210 are arranged in an array with a first row spacing a1 and a first column spacing b1, and yet the array of the openings 210 is not limited to that shown in FIG. 3. For example, the array of the openings 210 may include a plurality of concentric circles. Once the 3D printer has been in operation for a while, residues may fill some of the openings 210 (not shown in FIG. 3). The present invention imposes no limitations on the cross-sectional shape of each opening 210, either. In this embodiment, the cross section of each of the openings 210 is circular; however, the cross section of each opening 210 may instead be rectangular, triangular, otherwise polygonal, or irregular.

The jutting pins 510 are disposed on the upper side of the base plate 50. As the openings 210 in this embodiment are arranged in an array with a first row spacing a1 and a first column spacing b1, the jutting pins 510 are similarly arranged in an array with a second row spacing a2 and a second column spacing b2, wherein the first row spacing a1 equals to the second row spacing a2, and the first column spacing b1 equals to the second column spacing b2. At least the tips of the jutting pins 510 can be inserted into the openings 210. By inserting the arrayed jutting pins 510 into the arrayed openings 210 respectively, residues in the openings 210 can be pushed out, thereby conveniently removing the residues in the partition plate 20 of the 3D printer.

To remove residues more effectively, the cross-sectional shape of each of the jutting pins 510 preferably matches the cross-sectional shape of each of the openings 210. For example, when the cross section of each opening 210 is rectangular, the jutting pins 510 may be square columns or square pyramids; when the cross section of each opening 210 is triangular, the jutting pins 510 may be triangular prisms or triangular pyramidal frustums. In this embodiment, the cross-sectional shape of each of the openings 210 is circular, so the jutting pins 510 are circular columns. The cross-sectional area of each jutting pin 510 is less than the cross-sectional area of each opening 210 so that the jutting pins 510 can be respectively completely inserted into the openings 210 to push out the residues in the openings 210. In order to clear away the residues, the height of each of the jutting pins 510 is preferably greater than the thickness of the partition plate 20.

Reference is now made to FIG. 4, which is a sectional view showing how residues are removed by the residue removing device in the first embodiment of the present invention. When it is desired to remove the residues 220 with the residue removing device in this embodiment, the partition plate 20 is placed on the residue removing device in such a way that the arrayed jutting pins 510 are respectively inserted into the arrayed openings 210. Consequently, the residues 220 in the openings 210 are pushed out.

According to the above, in the residue removing device, the array of the jutting pins 510 corresponds to that of the openings 210, and at least the tips of the jutting pins 510 can be inserted into the openings. With the arrayed jutting pins 510 respectively inserted into the arrayed openings 210, residues 220 in the openings 210 can be pushed out, thereby conveniently removing the residues 220 in the partition plate 20 of the 3D printer.

Figure 5:
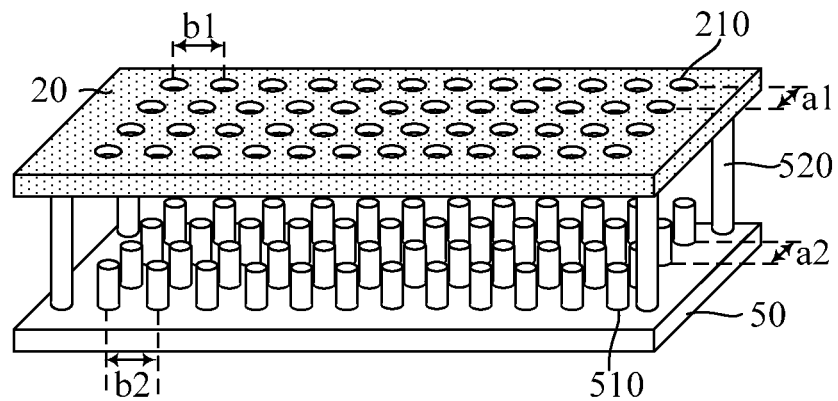
FIG. 5 is a perspective view of the residue removing device in the second embodiment of the present invention.

Please refer to FIG. 5 for the residue removing device in a second embodiment of the present invention. In FIG. 5, the same reference numerals as in FIG. 3 are used for the same parts. The residue removing device in the second embodiment is essentially the same as that in the first embodiment except that the former further includes a deformation element 520. The deformation element 520 is disposed on the upper side of the base plate 50 and is adjacent to the jutting pins 510.

The deformation element 520 has a first state and a second state. When in the first state, the deformation element 520 is higher than the jutting pins 510 so as to support the partition plate 20. When in the second state, the deformation element 520 is lower than the jutting pins 510 such that the jutting pins 510 are inserted into the openings 210 respectively. In this embodiment, the deformation element 520 includes four springs which are evenly distributed along the edges of the base plate 50. The first state of the springs is the normal, or non-compression, state, and the second state of the springs is the compression state. When the springs are compressed, the jutting pins 510 are inserted into the openings 210. The deformation element 520, however, is not limited to springs.

For example, the deformation element 520 may alternatively include elastic rods or other deformable parts, wherein the elastic rods can support the partition plate 20 when in an extension state and allow the residue removing device to remove the residues 220 when in a compression state. There is also no limitation on the number of the deformation element 520.

Figure 6:
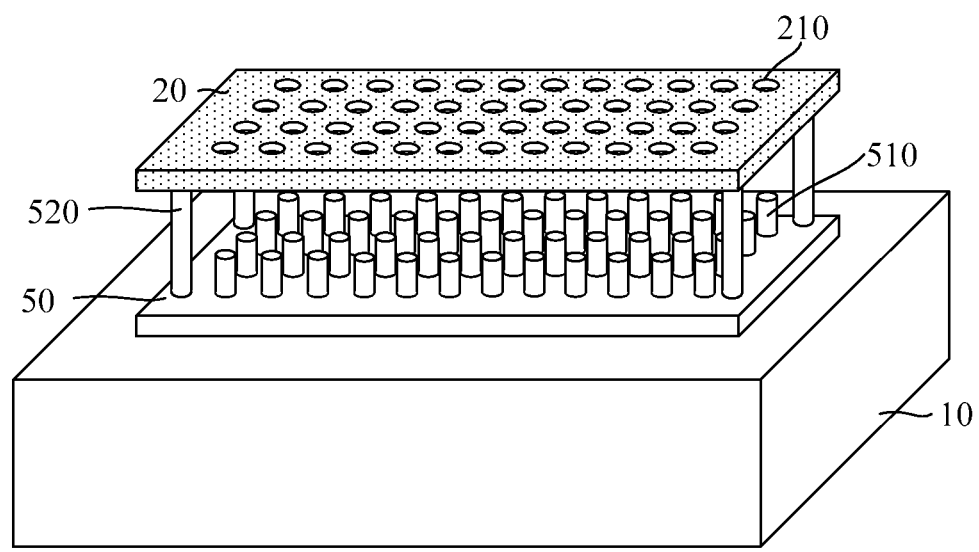
FIG. 6 is a perspective view of the 3D printer in the second embodiment of the present invention.

In this embodiment, the residue removing device can be directly placed in a 3D printer, as shown in FIG. 6. The 3D printer in this embodiment includes a working platform 10 in addition to the residue removing device and the partition plate 20. The residue removing device is provided on the working platform 10, and the partition plate 20 is provided on the residue removing device.

Figure 7:
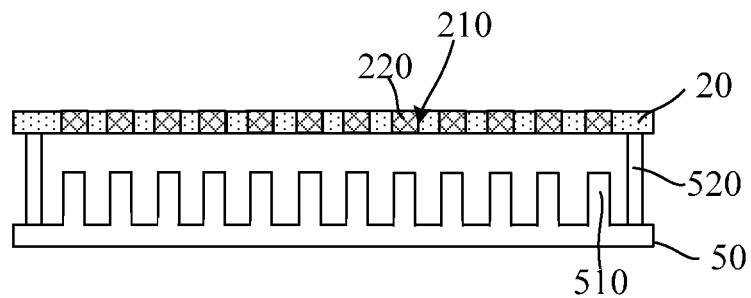
FIG. 7 is a sectional view of the residue removing device in the second embodiment of the present invention while the 3D printer is in operation.
Figure 8:
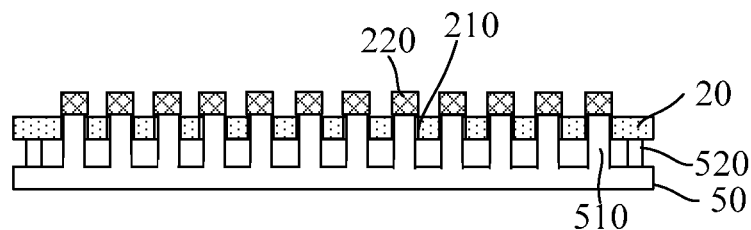
FIG. 8 is a sectional view showing how residues are removed by the residue removing device in the second embodiment of the present invention.

Referring to FIG. 7, when the deformation element 520 is in the first state, the height of the deformation element 520 is greater than the height of the jutting pins 510, so the deformation element 520 supports the partition plate 20, allowing the 3D printer to make a product on the partition plate 20. Once the product is completed, the openings 210 of the partition plate 20 may be filled with residues 220. As the deformation element 520 in this embodiment includes springs, a downward pressure on the springs will bring the deformation element 520 into the second state, as shown in FIG. 8, in which the height of the deformation element 520 is less than the height of the jutting pins 510. As a result, the arrayed jutting pins 510 are inserted into the arrayed openings 210 respectively to push out the residues 220, and the residues 220 are directly and conveniently removed from the 3D printer.

Figure 9:
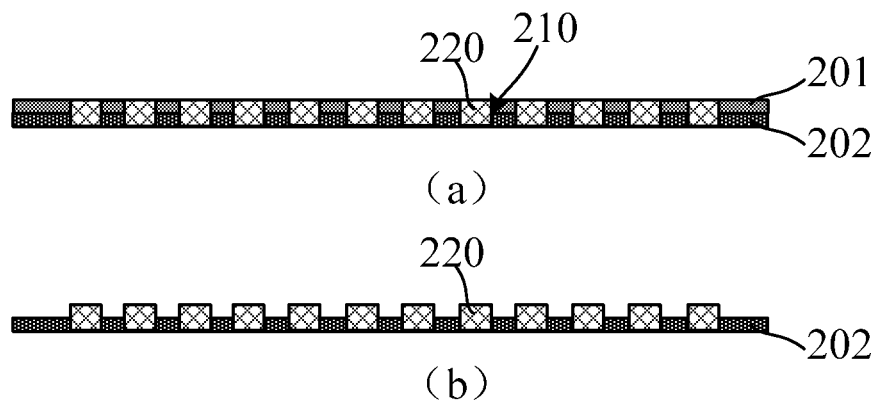
FIG. 9 is a sectional view of the partition plate of the 3D printer in the second embodiment of the present invention.

Preferably, the partition plate 20 is laminated and includes at least two detachable layers. In this embodiment, the partition plate 20 is composed of a first layer 201 and a second layer 202 detachably stacked together, as shown in FIG. 9(a). When it is desired to remove the residues 220, the first layer 201 is detached from the second layer 202, causing the residues 220 to fall off one of the layers to facilitate removal of the residues 220. There is no limitation on the number of layers of the partition plate 20. The partition plate 20 may have three, four, or more layers.

Figure 10:
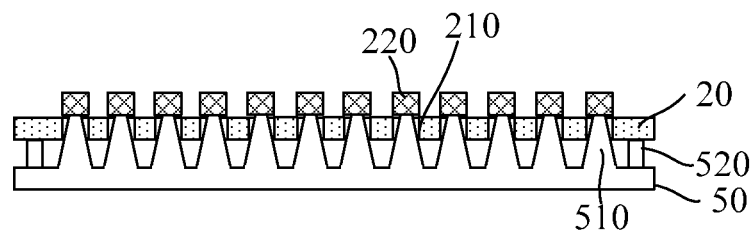
FIG. 10 is a sectional view showing how residues are removed by the residue removing device in the third embodiment of the present invention.

Please refer to FIG. 10 for a sectional view showing how residues are removed by the residue removing device in a third embodiment of the present invention. In FIG. 10, the same reference numerals as in FIG. 3 are used for the same parts. The residue removing device in the third embodiment is essentially the same as that in the first embodiment except that the jutting pins 510 are circular conical frustums, wherein the cross-sectional area of the top of each frustum is less than the cross-sectional area of each of the openings 210. As such, the tips of the jutting pins 510 can be inserted into the openings 210 to remove the residues 220.

The present invention provides a residue removing device and a 3D printer. The residue removing device is configured for removing the residues in the partition plate of the 3D printer. The partition plate has a plurality of openings arranged in an array. The residues are filled in the openings. The residue removing device is characterized by including a base plate and a plurality of jutting pins arranged in an array. The jutting pins are disposed on the upper side of the base plate. The array of the jutting pins corresponds to the array of the openings. At least the tips of the jutting pins can be inserted into the openings. As the array of the jutting pins corresponds to the array of the openings, and the tips of the jutting pins can be inserted into the openings, the arrayed jutting pins can be respectively inserted into the arrayed openings to push out the residues in the openings, thereby conveniently removing the residues in the partition plate of the 3D printer.

According to the above, in the residue removing device, the deformation element 520 is disposed on the upper side of the base plate 50, is adjacent to the jutting pins 510, is higher than the jutting pins 510 when in the first state, and is lower than the jutting pins 510 when in the second state. Thus, the residue removing device can be placed on the working platform of the 3D printer, and the partition plate 20, on the residue removing device. When the deformation element 520 is in the first state, the height of the deformation element 520 is greater than that of the jutting pins 510, allowing a product to be manufactured on the partition plate 20. Once the manufacture of the product is completed, the deformation element 520 enters the second state, in which the height of the deformation element 520 is less than the height of the jutting pins 510 such that the arrayed jutting pins 510 are respectively inserted into the arrayed openings 210 to directly remove the residues 220 on the 3D printer. The foregoing operation can be done with ease.

In addition, in the 3D printer, the partition plate 20 is laminated and includes at least two detachable layers. When the partition plate 20 is filled with residues 220, the detachable layers can be detached from each other to facilitate removal of the residues 220.

While the invention herein disclosed has been described by means of specific embodiments, numerous modifications and variations could be made thereto by those skilled in the art without departing from the scope of the invention set forth in the claims.

What is claimed is:

1. A 3D printer for use on a working platform, comprising a partition plate having a plurality of openings arranged in an array; and
a residue removing device to be disposed on the working platform and for removing residues that may be filled in the openings, the residue removing device including a base plate;
a plurality of jutting pins disposed on an upper side of the base plate, wherein the jutting pins are arranged in an array corresponding to the openings array such that the jutting pins are capable of being inserted into the openings; and
a distance-adjusting element configured to adjusting a distance between the partition plate and the base plate, wherein the distance-adjusting element in a first state adjusts the distance to be greater than a height of at least one of the jutting pins and in a second state adjusts the distance to be smaller than said height of said jutting pin.

2. The 3D printer as claimed in claim 1, wherein the distance-adjusting element is a deformation element.

3. The 3D printer as claimed in claim 2, wherein the partition plate is laminated and comprises at least two detachable layers.

4. The 3D printer as claimed in one of claims 2, wherein the deformation element comprises a spring or an elastic rod located at an edge of the upper side of the base plate.

5. The 3D printer as claimed in one of claims 2, wherein the height of each of the jutting pins is larger than a thickness of the partition plate.

* * * * *